March 28, 1961  R. KEMMETMÜLLER  2,977,095
APPARATUS FOR HEATING OR EVAPORATING
LIQUID MEDIA OR FOR HEATING GASES Filed May 8, 1956  2 Sheets-Sheet 2

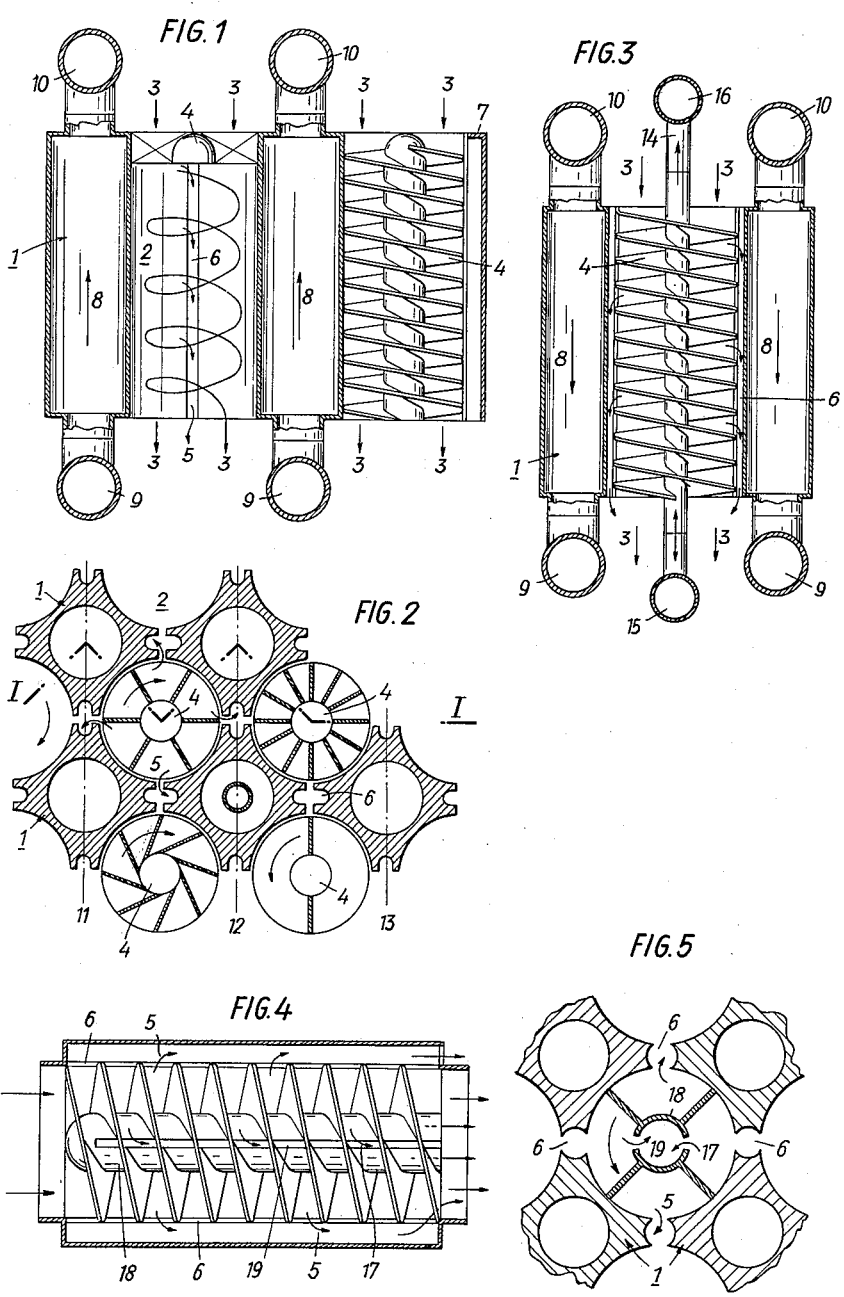

*Inventor*
R. Kemmetmüller

United States Patent Office 2,977,095
Patented Mar. 28, 1961

2,977,095
APPARATUS FOR HEATING OR EVAPORATING LIQUID MEDIA OR FOR HEATING GASES

Roland Kemmetmüller, Vienna, Austria, assignor to Waagner-Biró Aktiengesellschaft, Vienna, Austria, an Austrian firm Filed May 8, 1956, Ser. No. 583,409
Claims priority, application Austria June 8, 1955
13 Claims. (Cl. 257—241)

The invention relates primarily to an apparatus for heating or evaporating liquid media or for heating gases, which is characterized in that a gaseous heating medium is passed in twisting currents, whose axis is parallel to the direction of flow of another liquid or vaporous medium. According to another feature of the invention the boundary layers forming in the twisting currents of the heating medium are withdrawn in order to increase the film coefficients of heat transfer and to reduce the resistance to flow. In heating media which contain dust, another feature of the invention provides that the dust particles can be withdrawn and dicharged simultaneously with the peeling of the boundary layer. In the heat exchanger, particularly a boiler, the preferably cylindrical spaces required for the twisting currents of the heating medium are provided by an assembly of appropriately formed tubular heat exchanger elements. Said elements are of multi-cornered, preferably Maltese cross shape in cross-section.

Some typical embodiments of heat exchangers according to the invention are shown in the drawings. The drawings are partly diagrammatic. With reference to said drawings:

Fig. 1 is an elevational view of one form of the invention.

Fig. 2 is a horizontal sectional view of the form of Fig. 1.

Fig. 3 is an elevational view of a further form.

Fig. 4 is an elevational view of another embodiment.

Fig. 5 is a top plan view of the form of Fig. 4.

Figure 6:
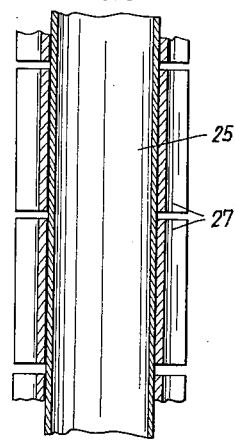
Fig. 6 is an elevational view of yet a further form.

In Figs. 1 and 2, the numeral 1 denotes the heat exchanger elements, which are juxtaposed to form the spaces 2 through which passes the heating medium. Thus the heating medium flows according to the arrows 3 through guide devices 4 into said spaces 2. The heating medium flows in a twisting current through said spaces 2 and emerges from the spaces 2 according to arrows 3. The boundary layers of the twisting current are peeled according to arrows 5 by the peeling slots 6. Said peeled-off particles of the medium are fed back to the main current 3 according to arrows 5 at the lower ends of the heat exchanger elements 1. The peeling slots or peeling passages 6 are covered at 7, e.g. at the top (at top right in Fig. 1). The medium to be heated or to be evaporated flows in a counter-current direction thereto according to arrows 8. That medium can be fed through supply conduits 9 which are common to heat exchanger elements 1 lying in a row and can be discharged through similar conduits 10. As is apparent from Figs. 1 and 2 of the drawing the supply pipes 9 and the discharge pipes 10 with the intervening heat exchanger elements 1 provide structurally self-contained units, which may simply be juxtaposed as is indicated in the top plan view at 11, 12 and 13. The several juxtaposed groups are spaced by the guide means 4. The guide means 4 within one plant may be of the same type or, as shown, of different type.

In the embodiment according to Fig. 3 heat exchanger elements are again connected to form groups. The medium to be heated passes through the elements according to the arrows 8. The heating medium flows through the spaces between the elements 1 according to arrows 3 in a twisting current. Centrally disposed tubes 14 carrying the guide means 4 extend through the spaces. The medium to be heated or any third medium is passed through said tubes 14, as is indicated by arrows 8. This medium flowing through the tubes 14 is thus also caused to interact with the heating medium according to arrows 3. Owing to this arrangement the guide means 4 serve as additional heating surfaces. The centrally disposed tubes 14 carry manifolds 15 and 16 to provide additional self-contained groups which can be installed with ease.

From the construction according to Figs. 4 and 5 it is apparent that the boundary layer of the twisting current can be sucked off externally and internally. The external peeling is effected according to arrows 5, the internal peeling is indicated by arrows 17. The centrally disposed inner tube is indicated at 18 and has slots 19 for the internal peeling of the boundary layer. The guide means are again indicated at 4.

Figure 8:
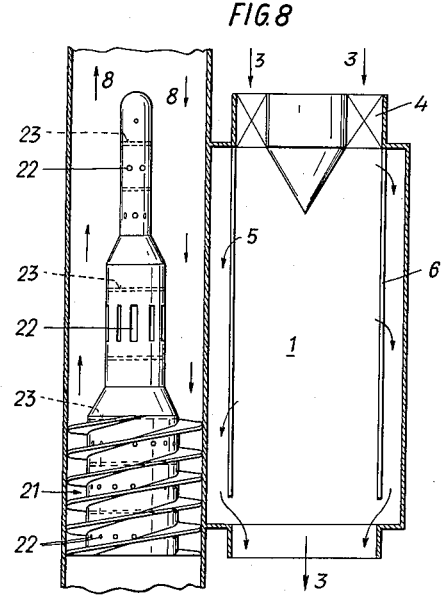
Fig. 8 is another embodiment of the invention.
Figure 9:
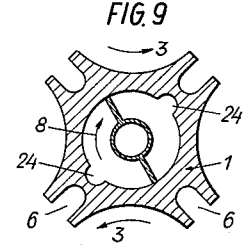
Fig. 9 is a horizontal section of Fig. 8.

In the embodiment according to Fig. 8 the heat exchanger 1 has disposed therein a displacement body 21, which has equalizing openings 22, through which the medium to be heated can enter the interior of said body 21. To prevent a flow inside the displacement body 21, transverse discs 23 are provided. The displacement body 21 is shaped so that the medium can be caused to flow at any desired velocity. With the aid of the guide means 4 the medium can be guided with a twist as desired. As is apparent from Fig. 9 this embodiment enables also to provide means (peeling passages 24) for sucking the boundary layer from the medium flowing inside the element 1.

Figure 7:
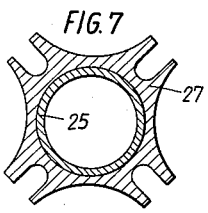
Fig. 7 is a horizontal section of the form of Fig. 6.

Figs. 6 and 7 show an advantageous construction of such a heat exchanger element 1. A core tube 25 has appropriately formed castings or pressings 27 drawn thereon in heat conducting relation. It is obvious that such heat exchanger elements may also be made entirely by casting, drawing or pressing, without a core tube.

Figure 11:
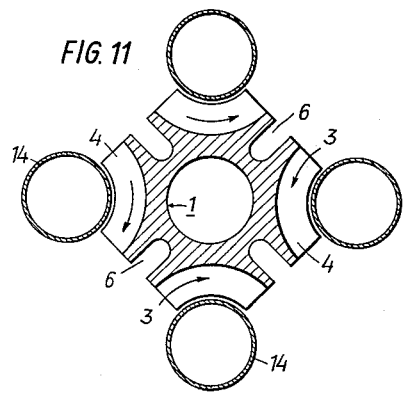
Fig. 11 is yet another form of the invention shown in horizontal section.
Figure 10:
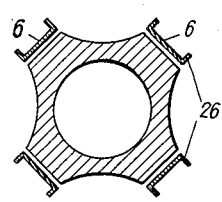
Fig. 10 is a horizontal section of a further form of heat exchanger element.

In the heat exchanger element 1 according to Fig. 10 the peeling passages are replaced by mounted channel members 26. The embodiment of Fig. 11 shows that the guide means 4 may also be integral with the heat exchanger elements 1.

The invention is not limited to the exemplary embodiments shown. The heat exchanger elements may also be of substantially round shape. It is obvious that the invention is not only applicable for heating and evaporating but also for cooling, condensing and superheating and the like processes. The peeling of the boundary layers can always be effected also inside the spaces passed through by the twisting current. The several structurally self-contained groups may be connected in parallel or in series as desired. It is preferable to provide for a series connection for the internally flowing medium.

I claim:

1. In a heat exchange apparatus, a plurality of conduit means of tubular form through which a first fluid medium is adapted to flow, the said conduit means being so arranged and supported as to provide substantially cylindrical components therebetween through which a second fluid medium is adapted to flow countercurrent to the first fluid medium, guide means in each of said substantially cylindrical components functioning to impart twisting movement to the second fluid medium, the axis of which is parallel to the direction of flow of the first fluid medium, and means cooperable with the entire length of the cylindrical components to continuously withdraw the boundary layers forming in the twisting currents of the second fluid medium at the heat transferring surfaces into passages in the conduit means parallel to the axis to augment the film coefficient of heat transfer and to reduce the resistance to flow.

2. A heat exchanger according to claim 1, characterized in that each conduit means is of multi-cornered shape in cross section.

3. A heat exchanger according to claim 2, characterized in that the conduit means are structually combined in groups and these groups are juxtaposed to form the cylindrical components for the second fluid medium, each such group being formed substantially of the conduit means and corresponding supply and discharge pipes operatively connected to each of the conduit means.

4. A heat exchanger according to claim 3, characterized in that each conduit means is spaced from an adjacent conduit means by the said guide means.

5. A heat exchanger according to claim 4, characterized in that the guide means are dimensioned to determine the dimensions of the means for withdrawing the boundary layer of the twisting current.

6. A heat exchanger according to claim 1, characterized in that a guide means for the twisting current is carried on tubes which constitute additional heating surfaces for the first medium.

7. A heat exchanger according to claim 1, characterized in that displacement tubes are provided in the conduit means and pass the medium to be heated or evaporated at the required velocity over the inner heating surface of the conduit means.

8. A heat exchanger according to claim 7, characterized in that the displacement tubes have openings so that the interior of said tubes can be filled with liquid.

9. A heat exchanger according to claim 7, characterized in that the displacement tubes have discs disposed transversely to the longitudinal axis to prevent a flow in the axial direction.

10. A heat exchanger according to claim 7, characterized in that the outer boundaries of the displacement tubes are provided with guide means for guiding the medium to be heated in the form of a twist.

11. A heat exchanger according to claim 7, characterized in that the displacement tubes are provided with withdrawing means for withdrawing the boundary layer forming at their outer boundaries.

12. A heat exchanger according to claim 1, characterized in that the conduit means are of equal internal diameter.

13. A heat exchanger according to claim 1, characterized in that the cooperable means are formed by separate channel members attached to the conduit means.

References Cited in the file of this patent

UNITED STATES PATENTS

| | | |
|---|---|---|
| 1,773,954 | Coutant | Aug. 26, 1930 |
| 2,236,358 | Allardice | Mar. 25, 1941 |
| 2,761,526 | Kemmetmuller | Sept. 4, 1956 |

FOREIGN PATENTS

| | | |
|---|---|---|
| 175,004 | Austria | May 26, 1953 |
| 184,592 | Austria | Feb. 10, 1956 |
| 520,792 | Germany | Mar. 14, 1931 |
| 900,989 | France | July 13, 1945 |